INVENTOR
HUGH K. HOWERTON

BY /Herman L. Gordon/
ATTORNEY

United States Patent Office 3,433,952
Patented Mar. 18, 1969

3,433,952
SPECTROPHOTOFLUOROMETER HAVING CORRECTION MEANS PROVIDING SUBSTANTIALLY EQUAL ENERGY EFFECTS IN RESPONSE AT DIFFERENT EXCITATION WAVELENGTHS
Hugh K. Howerton, Silver Spring, Md., assignor to American Instrument Co., Inc., Silver Spring, Md.
Filed July 18, 1966, Ser. No. 565,923
U.S. Cl. 250—71
Int. Cl. G01n 21/38
9 Claims

ABSTRACT OF THE DISCLOSURE

An energy-compensated spectrophotofluorometer consisting of an assembly including a sample holder, a light source and a photomultiplier detector, with a first adjustable monochromator between the source and the sample holder and a second adjustable monochromator between the sample holder and the photomultiplier detector. A thermopile is located to receive a portion of the radiation from the source, and its signal goes through a deviation amplifier to develop a correction signal $e_3$. The photomultiplier signal goes through a fixed gain amplifier to develop an output signal $e_1$. A computer network receives a reference signal $e_2$ and the signals $e_1$ and $e_3$ and derives a corrected, energy-compensated output signal $e_4$ equal to $e_1 e_2 / e_3$.

---

This invention relates to spectrometry, and more particularly to an improvement in an instrument for measuring the luminescent response of materials excited by various wavelengths of visible and ultra-violet radiation, or when excited by one particular wavelength.

A main object of the invention is to provide a novel and improved apparatus for spectrometrically analyzing luminescent materials and for determining the response of such materials to radiation, the apparatus being energy-compensated, namely, being arranged so that in the scanning mode it can scan a sample with light of variable wavelength but with a response providing the effect of substantially equal energy at each wavelength, and so that in the analyzing mode the photosensitive detector and emission monochromator portion thereof will be compensated for differences in wavelength sensitivity.

A further object of the invention is to provide an improved spectro-fluorescence measuring instrument which includes means to scan a sample of fluorescence material with light of variable wavelength but having correction means providing substantially equal energy effects in the response thereto at each wavelength, so that it can produce an energy-compensated excitation spectrum, and which also includes means to compensate for variations in sensitivity of the elements of the emission monochromator and photo-tube element thereof for different wavelengths of the emission spectrum, the apparatus being relatively simple in construction, being easy to operate, and permitting rapid and accurate quantitative assays of the fluorescent and phosphorescent properties of materials.

A still further object of the invention is to provide an improved spectrofluorometer which is provided with means for successively exciting a sample with all the spectral components of white light or of a polychromatic light source for determining the characteristic wavelength or wavelengths to which the sample has major fluorescent response, and for quantitatively analyzing such major response for each of such excitation wavelengths, the spectrofluorometer including means for automatically computing and applying corrections for different excitation energies at the different excitation wavelengths and being provided with means for applying a further correction factor to take care of variations in emission response sensitivity of the apparatus at different emission wavelengths, so that a complete and accurate quantitative assay of the fluorescent properties of the sample may be obtained, and so that the material may be accurately identified, the apparatus requiring the use of only a small sample of the material to be analyzed, being highly sensitive, being applicable for identifying and quantitatively analyzing a wide range of fluorescent materials, and permitting the continuous activation of a sample and the measurement of resulting fluorescence throughout the ultra-violet and visible regions.

Further objects and advantages of the invention will become apparent from the following description and claims, and from the accompanying drawings, wherein:

Figure 2:
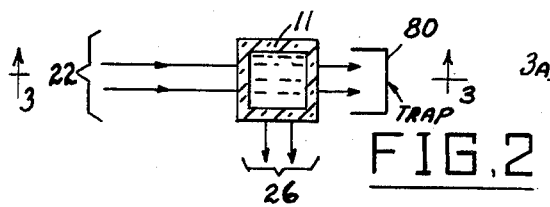
FIGURE 2 is an enlarged diagrammatic horizontal cross-sectional view taken through the sample cell of the apparatus of FIGURE 1, showing the relative directions of excitation light rays impinging on the sample cell and the emission light rays emerging from the cell.

Referring to the drawings, 10 generally designates a spectrofluorometer which is basically similar to that disclosed in U.S. Patent No. 2,971,429 to Hugh K. Howerton. The spectrofluorometer 10 comprises a support 70 formed with a first housing portion 71 containing the activation monochromator components of the spectrofluorometer, and a second housing portion 72 containing the fluorescence monochromator components. A suitable light source, for example, a xenon lamp 12 is mounted in a housing 73 communicating through a passage 74 with the interior of housing portion 71. The light from lamp 12 is reflected from a first concave mirror 75 fixedly mounted in housing portion 71 to a reflectance grating 17, which is pivotally mounted in said housing portion 71 for oscillation on a vertical axis. The dispered spectral components of the light from lamp 12 are reflected from the grating 17 to a second concave fixed mirror 76 mounted in housing portion 71 and are reflected from mirror 76 through a light gate assembly 77 into a cell housing 78 in which a transparent sample cell 11 is mounted. The wall of cell housing 78 opposite light gate assembly 77 is provided with a light trap 80 (see FIGURES 2 and 3) to receive and suppress the portion of the light from the light beam 22 which passes through the sample cell 11.

Figure 1:
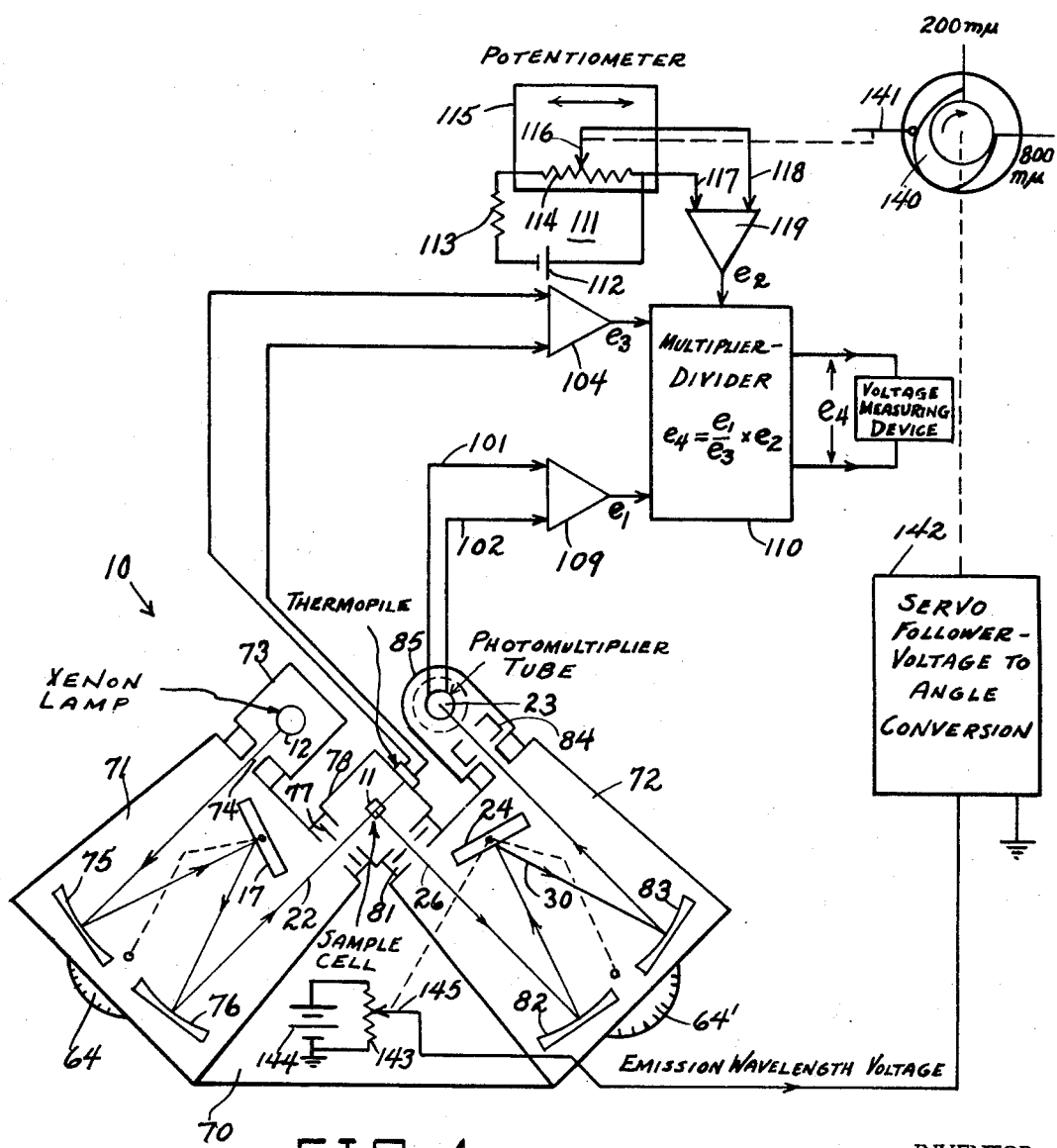
FIGURE 1 is a schematic diagram of an improved energy-compensated spectrofluorometer constructed in accordance with the present invention.

The fluorescent light generated by a liquid sample in cell 11, shown as the beam 26, passes through a light gate assembly 81 into the second housing portion 72 and is reflected from a fixed concave mirror 82 mounted therein to a reflectance grating 24. Grating 24 is pivotally mounted in housing portion 72 for oscillation on a vertical axis. The spectral components of the fluorescent light are reflected from grating 24 as the beam 30, and are reflected from a fixed concave mirror 83 through a light gate assembly 84 into a photo-multiplier housing 85 attached to housing portion 72. The beam 30 passes to a photomultiplier tube 23. The output of photomultiplier tube 23 is carried by lead wires 101 and 102, shown in FIGURE 1.

Suitable drive means may be provided for selectively oscillating the reflectance gratings 17 and 24, as described in the above-mentioned U.S. Patent No. 2,971,429. The gratings are drivingly coupled to respective wavelength-calibrated rotatable indicator discs 64 and 64' which may be manually rotated to set the gratings 17 and 24 to positions corresponding to desired monochromator wavelengths, as described in said prior patent.

In order to perform an accurate and positive quantitative assay, the fluorescent response of a sample material to a spectrum of excitation wavelengths should be that which is obtained by exposure to excitation spectral components having equal energies. It is well known that most excitation light sources do not have uniform energy distribution over their spectra, namely, the various spectral components of the emission from the light sources usually have different energies. This is true of the xenon lamp 12, as well as of most other wide-range light sources which may be employed. Also, the amount and distribution of the energies may be affected by various factors such as aging of the lamp, temperature conditions, or the like.

To compensate for the variation in the energies of the different excitation wavelengths scanning the sample material, a correction must be applied which will have the effect of apparently equalizing the excitation energies. In accordance with the present invention, this correction is applied to the output of the photomultiplier tube, and is applied in a manner to take care of changes in the type of light source employed and of variations in its output characteristics. Thus, the apparatus of the present invention automatically derives a correction factor $1/e_3$ determined by the amount of energy in each excitation wavelength and applies it to a signal $e_1$ derived from the output of the photomultiplier tube 23, to cancel out the effects of non-uniform energies in the scanning excitation wavelengths.

Figure 3:
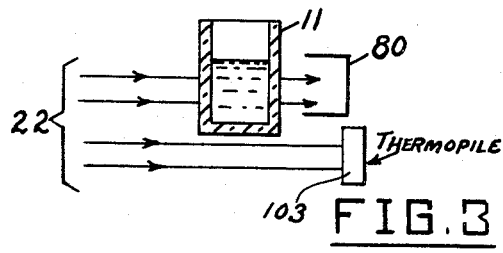
FIGURE 3 is a diagrammatic vertical cross-sectional view taken substantially on the line 3—3 of FIGURE 2.

As shown diagrammatically in FIGURE 3, a conventional thermopile 103 is mounted subjacent the light trap 80 in a position to receive a portion of the radiation of the excitation beam 22. The thermopile 103 may comprise two or more couples of different materials, and may, for example, be similar to Thermopile No. 5235, manufactured by Eppley Laboratory, Inc., Newport, R.I. This thermopile comprises 12 bismuth-silver junctions with a lampblack coating and has a nominal resistance of 11.4 ohms. The voltage-energy characteristic of the thermopile over the practical working range is substantially linear, and its slope has a value of approximately 0.058 microvolt per microwatt per square centimeter. Thus, the thermopile 103 represents an energy-to-voltage converter which is substantially linear in its response.

Figure 4:
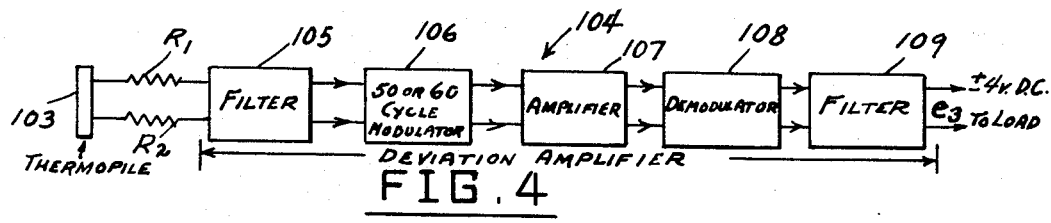
FIGURE 4 is a block diagram showing the electrical circuitry associated with the thermopile employed in the spectrofluorometer of FIGURE 1.

As shown in FIGURE 4, the thermopile 103 may be connected to the input of a suitable deviation amplifier system 104 through resistors $R_1$ and $R_2$. The deviation amplifier system 104 may comprise an input filter 105, a 50 or 60 cycle modulator 106, a conventional fixed-gain amplifier 107, a demodulator 108, and an output filter 109, connected in the manner shown in FIGURE 4, providing a direct-current output signal $e_3$.

The output of the photomultiplier tube 23 is carried by the wires 101 and 102 to the input of a conventional fixed-gain amplifier 109, providing the output signal $e_1$.

Designated at 110 is a computer network having three inputs. At one input the network 110 receives a reference signal $e_2$. This signal is derived from a simple potentiometer circuit 111 comprising a fixed voltage source, such as a battery 112 connected in series with a resistor 113 and the winding 114 of a potentiometer 115. The sliding contact 116 and one terminal of winding 114 are connected by wires 117 and 118 to the input of a conventional fixed-gain amplifier 119, providing the output signal $e_2$.

Figure 5:
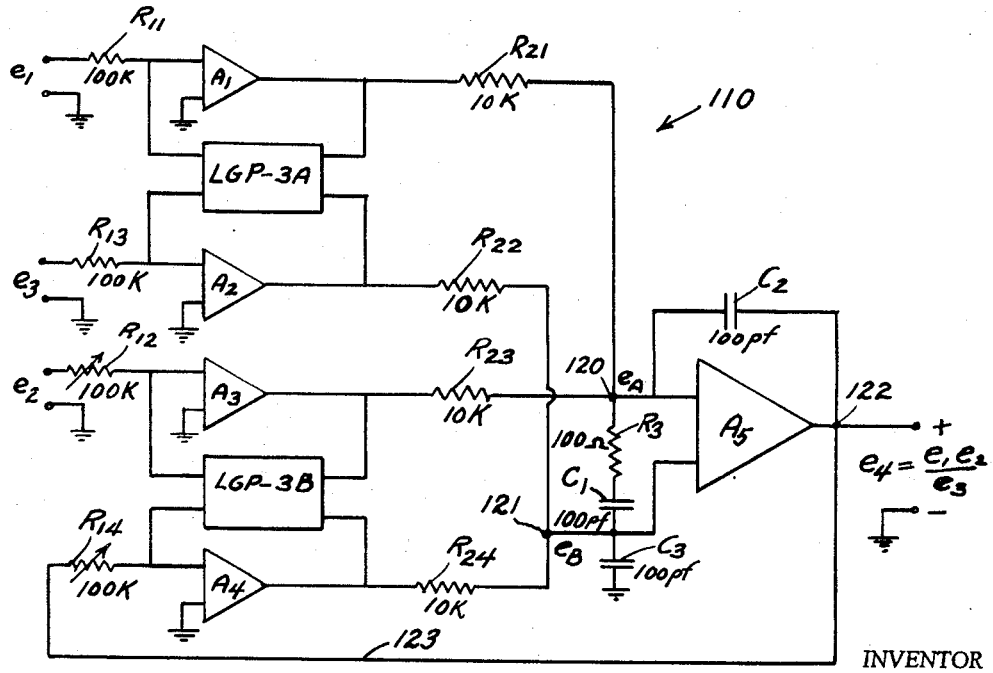
FIGURE 5 is a wiring diagram of the energy correction-computing circuit employed in the spectrofluorometer of FIGURE 1.

The computer network, shown in detail in FIGURE 5, is arranged to provide an output signal $e_4$ according to the expression $$e_4 = e_1 e_2 / e_3$$

The signals $e_1$, $e_3$ and $e_2$ are fed through respective resistors $R_{11}$, $R_{13}$ and $R_{12}$ to operational amplifiers $A_1$, $A_2$ and $A_3$. The outputs of amplifiers $A_1$ and $A_3$ are delivered through respective resistors $R_{21}$ and $R_{23}$ to a junction 120. The output of amplifier $A_2$ is delivered to a junction 121 through a resistor $R_{22}$. Junctions 120 and 121 are connected to the inputs of an operational amplifier $A_5$. A resistor $R_3$ and a capacitor $C_1$ are connected in series across junctions 121 and 120. A capacitor $C_3$ is connected between junction 121 and ground. A capacitor $C_2$ is connected across junction 120 and the output terminal 122 of amplifier $A_5$. Terminal 122 is connected through a resistor $R_{14}$ to the input of operational amplifier $A_4$. The inputs of amplifiers $A_1$ and $A_2$ are connected to the input terminals of a logarithmic amplifier LGP–3A and the output terminals of said logarithmic amplifier are connected respectively to the output terminals of amplifiers $A_1$ and $A_2$, as shown. Similarly, the inputs of amplifiers $A_3$ and $A_4$ are connected to the input terminals of another logarithmic amplifier LGP–3B and the output terminals of the last-named logarithmic amplifier are respectively connected to the output terminals of amplifiers $A_3$ and $A_4$.

The operational amplifiers $A_1$ to $A_5$ may be similar to Nexus Type SA–2 amplifiers, manufactured by Nexus Research Laboratories, Canton, Mass. The logarithmic amplifiers LGP–3A and LGP–3B may be similar to Nexus Type LGP–3 produced by the same manufacturer.

It can be shown that the signal $e_A$ at the junction 120 will be given by $$e_A = -a \log \frac{\sqrt{e_1 e_2}}{R_{11}}$$

where $a$ is a constant.

It can be similarly shown that the signal $e_B$ at junction 121 will be given by $$e_B = -a \log \frac{\sqrt{e_3 e_4}}{R_{11}}$$

The output signal $e_4$ at terminal 122 will be given by $$e_4 = -A \left( a \log \frac{\sqrt{e_1 e_2}}{R_{11}} - a \log \frac{\sqrt{e_3 e_4}}{R_{11}} \right)$$

where $A$ is another constant.

By making $A$ sufficiently large, the value of $e_4/A$ aproaches zero, and if it is considered to be zero, $$\sqrt{e_1 e_2} = \sqrt{e_3 e_4}$$

and $$e_4 = e_1 e_2 / e_3$$

Thus, a correction factor of $1/e_3$ will be constantly applied to the photomultiplier output signal $e_1$, thereby providing automatic compensation for variations in excitation wavelength energy. The output signal $e_4$ will thus represent the fluorescent response as a coefficient of the reference signal voltage $e_2$.

Figure 2A:
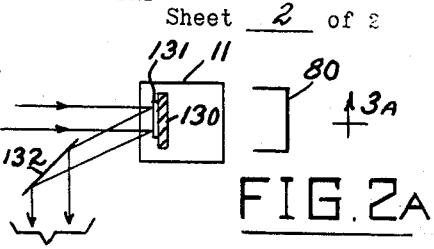
FIGURE 2A is a diagrammatic horizontal cross-sectional view similar to FIGURE 2, but illustrating a modification wherein the sample is mounted on a carrier plate.
Figure 3A:
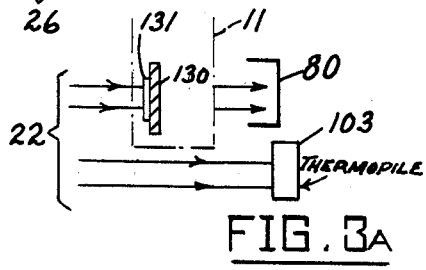
FIGURE 3A is a diagrammatic vertical cross-sectional view taken substantially on the line 3A—3A of FIGURE 2A.

As shown in FIGURES 2A and 3A, the sample 131 (for example, in solid form) may be supported on a vertical plate 130 suitably mounted in the transparent sample cell 11, and the fluorescent radiation therefrom may be reflected from a suitably mounted inclined mirror 132 so that it is directed through light gate assembly 81 into housing portion 72 toward concave mirror 82, substantially in the same form of the beam 26 as in FIGURE 3, with the thermopile 103 mounted subjacent the light trap 80 in a position to receive the portion of excitation beam 22 passing beneath cell 11.

As above mentioned, a further correction is made in order to compensate for none-uniform spectral sensitivity of the photomultiplier tube 23 and the emission monochromator assembly. The required compensation does not normally change with time or with replacement of the photomultiplier tube, and is only a fuction of emission wavelength. This compensation is provided by employing a suitably mounted and suitably contoured rotatable cam 140 having a follower element 141 which is drivingly coupled to the sliding contact element 116 of potentiometer 115. This cam 140 is suitably coupled to the emission wavelength-adjusting disc 64' so that the sliding contact 116 will be adjusted in accordance with the position of disc 64' to provide the required emission compensation. Thus, the cam 140 may be driven by a conventional servo unit 142, which is in turn controlled by a voltage derived from a potentiometer 143 connected across a battery 144, the sliding contact 145 of the potentiometer 143 being drivingly connected to the emission reflectance grating 24. The adjustment of disc 64' changes the reference voltage $e_2$ in accordance with the required emission compensation.

While a specific embodiment of an improved energy-compensated spectrofluorometer has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a spectrophotometer, a source of radiant energy, a sample holder, a monochromator between said source and said sample holder, means to direct excitation radiation from said source through said monochromator, said monochromator being adjustable to select different spectral components of said source for transmission to said sample holder, a photosensitive detector, means to transmit emission radiation from said sample holder to said detector, means to measure the output of said detector, radiant energy-responsive means mounted in a position to receive a portion of the excitation radiation reaching the sample holder, and means to modify the measured output of said detector, said last-named means comprising a computing network connected between the detector, the radiant energy-responsive means and the measuring means, said computing network being constructed to provide an output at the measuring means substantially in accordance with the quotient of the detector output and the output of the radiant energy-responsive means.

2. The spectrophotometer of claim 1, and wherein the means to transmit emission radiation from the sample holder to the detector comprises a second monochromator which is adjustable to select different spectral components of the emission radiation, and means to further modify the measured output of said detector in accordance with the selected emission spectral component.

3. The spectrophotometer of claim 1, and wherein said radiant energy-responsive means comprises a thermopile.

4. The spectrophotometer of claim 1, and wherein the means to modify the measured output of the detector comprises a computing network having at least two inputs, the output of the detector being connected to one input and the output of the radiant energy-responsive means being connected to the other input, the output of the computer network being connected to the measuring means, and means in the network to develop at its output a signal voltage substantially in accordance with the signal voltage at said one input divided by the signal voltage at said other input.

5. The spectrophotometer of claim 2, and wherein the means to further modify the measured output of the detector comprises means generating a reference signal voltage in accordance with the selected emission spectral component.

6. The spectrophotometer of claim 1, and wherein the means to modify the measured output of the detector comprises means to generate a first signal voltage $e_1$ in accordance wtih the response of the detector, means to generate another signal voltage $e_3$ in accordance with the response of said radiant energy-responsive means, means to generate a reference voltage $e_2$, network means to compute a corrected output voltage $e_4$ substantially in accordance with the expression $$e_4 = e_1/e_3 \times e_2$$

and means to connect said signal voltages and said reference voltage as inputs to said network means.

7. The spectrophotometer of claim 6, and wherein the means to transmit emission radiation from the sample holder to the detector comprises a second monochromator which is adjustable to select different spectral components of the emission radiation, and means varying said reference voltage $e_2$ in accordance with the selected emission spectral component.

8. The spectrophotometer of claim 7, and wherein said means to generate said signal voltage $e_3$ comprises a thermopile mounted adjacent said sample holder and exposed to a portion of the excitation radiant energy from said source, a deviation amplifier, and circuit means connecting said thermopile to the input of said deviation amplifier.

9. The spectrophotometer of claim 8, and wherein said second monochromator is provided with a movable control member for adjusting its selection of the different spectral components of the emission radiation, and wherein the means to generate the reference voltage $e_2$ includes a source of current, a potentiometer, means connecting the winding of the potentiometer to said source of current, said potentiometer having a sliding contact, means connecting the sliding contact and one terminal of the potentiometer winding to said network means to furnish an input voltage thereto, a rotatable non-circular cam, follower means engaging the periphery of said cam, and means drivingly coupling said movable control member to said cam.

References Cited

UNITED STATES PATENTS

| 2,971,429 | 2/1961 | Howerton | 250—71 X |
| 3,084,253 | 4/1963 | McHenry et al. | |
| 3,148,278 | 9/1964 | Schonborn et al. | |
| 3,161,771 | 12/1964 | Engborg et al. | |

RALPH G. NILSON, *Primary Examiner.*

SAUL ELBAUM, *Assistant Examiner.*

U.S. Cl. X.R.

73—355; 250—51.5, 77, 83.3